May 19, 1953
H. J. M. LAMBERT ET AL
2,639,042
SLIDING SHELF OR DRAWER SUPPORT
Filed April 13, 1949
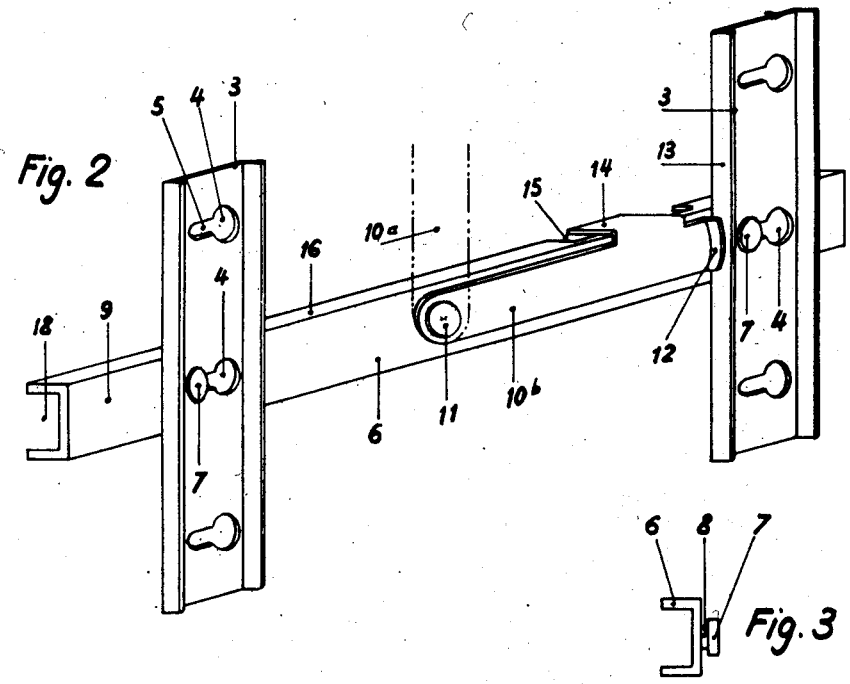
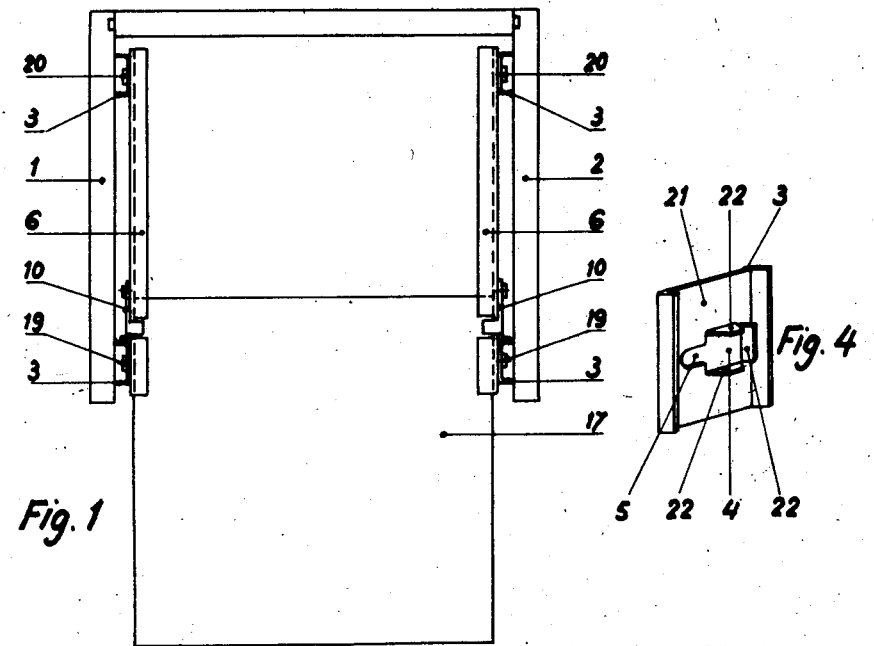
INVENTORS:
HENRI JACQUES MARC LAMBERT
GEORGES PAUL MONGIN
By Richardson, David and Gordon
ATTYS Patented May 19, 1953

2,639,042

UNITED STATES PATENT OFFICE 2,639,042

SLIDING SHELF OR DRAWER SUPPORT

Henri Jacques Marc Lambert, Sevres, and Georges Paul Mongin, St-Gratien, France

Application April 13, 1949, Serial No. 87,173
In France February 23, 1949

2 Claims. (Cl. 211—147)

Our invention has for its object an arrangement for securing and locking two elements with one another chiefly for fastening on a normally stationary support a removable member such as a slide for a piece of furniture, said slide being adapted to receive a shelf, a rod on which objects are to be suspended, a plate or generally speaking any suitable member.

According to a known method of securing a removable member to a stationary member through so-called keyhole or elongated slots, there are provided on the removable member two or possibly more heads with a projecting enlarged end along a substantially horizontal line of engagement and said removable member is secured to the stationary member by causing the projecting ends to engage corresponding openings in said stationary member, each of said openings ending at one side as a short longitudinal slot inside which it is possible to engage through a longitudinal movement the stem of the corresponding stud of which the enlarged head bears on the side of the slot opposed to the removable member.

In such a slot arrangement wherein the slots are arranged along downwardly directed lines, the weight of the removable member is frequently sufficient for holding the movable member in engagement, but in many cases, any upwardly directed vertical stresses applied to the movable member risk disengaging these elements and various locking means incorporating springs, bolts, cams or the like have been proposed for preventing the heads from rising inside their slots. These locking means are intricate and the above mentioned rising stresses are directly applied thereto which is a serious drawback.

Locking means of this type that do not appear as an actual positive locking means for the reasons stated hereinabove are furthermore difficult to use when it is desired to apply them to standard pieces of furniture in current use such as for instance when it is proposed to insert slides in a cupboard of any type. It is as a matter of fact essential in this case that the slide may be easily dismantled and reinserted chiefly when it is desired to provide for a ready vertical adjustment between opposite keyholes. Furthermore in the case of slides on pieces of furniture that are intended to receive drawers or shelves, a perfectly positive engagement of the slides with the piece of furniture is altogether indispensable, the overhanging position of the drawers or shelves in their outer position having a tendency to disengage the heads lying at the rear end of the slides.

The engaging and locking device according to our invention allows removing such drawbacks in a very simple and neat manner. Said novel arrangement consists primarily in that the said keyholes are arranged along a line that is substantially perpendicular to the direction of the forces acting between the two members on one another, the slots for said keyholes being parallel to such a line.

According to a particular embodiment of the invention, the arrangement includes locking means constituted for instance by a lever, a latch or the like, pivotally secured to one of the members to be assembled and bearing on the other member.

Further features of my invention will appear in the reading of the following description referring to accompanying drawings.

In said drawings given solely by way of example and by no means in a limiting sense, we have illustrated an embodiment of our invention as applied to slides for pieces of furniture, that are removable and vertically adjustable.

Fig. 1 is a plan view of the inside of a cupboard provided with two slides mounted on vertical racks.

Fig. 2 illustrates in perspective view as seen from the rear a slide that engages two vertical rack-bars and is bolted thereto.

Fig. 3 is an end view of a slide.

Fig. 4 is a perspective view of a modified advantageous embodiment of the keyhole slot.

In the example illustrated in Figs. 1 and 2 each of the sides 1—2 of a piece of furniture carries a vertical rack 3, said racks are provided with keyholes constituted by an opening 4 inside which opens laterally a short slot 5, said slot being arranged as illustrated horizontally and from front to rear with reference to the rack opening on the piece of furniture.

In Fig. 2 has been illustrated a slide 6 having studs 8 engaging two keyholes 4 along the same horizontal line by means of the enlarged projecting head 7 of the stud which is shown with its stem 8 in Fig. 3 illustrating said slideway in end view. In Fig. 2 the projecting heads 7 are shown as engaging the openings 4 after the slide 6 has been urged forwardly in parallelism with the horizontal line of engagement up to the point illustrated where the stems 8 abut against the forward end of the slots 5.

In the example illustrated in Figs. 1 and 2 the locking of the slide 6 is obtained through a lowering of a lever 10 from position 10a to 10b said lever being pivotally secured to the slide 6 by the stud 11. In its position 10b drawn in solid lines in Fig. 2 a projecting lug 12 at the end of the lever 10 bears against the flange 13 of the corresponding rack 3 so as to prevent the slide 6 from disengaging the position it has been given.

The lever 10 includes a further horizontal lug 14 which is readily accessible by reason of the presence of the recess 15 in the upper flange 16 of the slide 6.

For releasing said lever, it is therefore sufficient to raise the lug 14 with the finger after of course releasing the shelf 17 adapted to slide in the U-shaped or the like opening 18 in the slide. The lug 14 being raised and the lever entering the position 10a, it is possible to release the slide after which the heads 7 of the studs 8 may be released through the openings 4 of the keyholes.

Fig. 1 illustrates an overhung loaded shelf 17. It will be observed that the stems of the heads 19 to the front of the piece of furniture bear directly on the edges of the slots 5 corresponding to said heads so that the locking levers 10 are submitted to no straining through the action of such heads.

In the same case of an overhung loaded shelf, the stems of the heads 20 at the rear of the piece of furniture bear vertically upwards on the edge of the corresponding slots 5 also in a very direct manner without this leading to any straining of the levers 10.

The horizontal arrangement of the slots with the main forces directed vertically upwards or downwards and the absence of any substantial play between the stems of the heads and the edges of the grooves 5 produces in a remarkably easy manner, with a maximum rigidity and simplicity, a perfectly positive engagement of the slides with their racks.

The openings of the keyholes may be round, square, rectangular or the like provided they allow a passage for the corresponding projecting ends of the heads.

Fig. 4 shows by way of example an interesting embodiment of the keyholes in which the slot 5 has been obtained by a punching out of the rack material, the opening 4 being square and being obtained by stamping or cutting of the surface 21 of the rack 3 followed by folding through 90° the three lugs 22 defining said square opening and preventing the projecting end of the corresponding head from moving behind the surface 21 otherwise than through a sliding movement of the stem 8 inside the groove 5 until it reaches the position of disengagement; this makes the release of the slideway much easier.

Obviously our invention is by no means limited to the form of execution illustrated and described, except as defined in the appended claims.

What we claim is:

1. A support for sliding shelves, drawers and the like comprising spaced, vertical and horizontal members substantially perpendicular to one another and joined together, the vertical members being spaced from one another and having spaced, aligned keyhole slots along their lengths, the elongated portion of said slots extending forwardly and being substantially perpendicular to the longitudinal axis of said vertical members, each horizontal member having a spaced, headed stud adjacent each end, said studs being engageable with said keyhole slots and lockable therewith upon movement of said horizontal member in a forward direction to position said studs in the elongated portion of said slots, each horizontal member having a recess formed in its upper surface adjacent one end, a locking lever pivoted on said horizontal member between said vertical members, said lever having a laterally extending lug which is accessible through said recess when the lever is in locking position, said lever having at its free end a lug extending in a direction opposite to that of said first lug, said end lug being frictionally engageable with the adjacent vertical member to lock said vertical and horizontal members against relative movement.

2. A device according to claim 1, in which the lug at the end of said lever is formed in an arc which is tangent to the surface of the adjacent vertical member when the lever is in locking position, said lever being in locking position when the highest point of tangency of said arc is in contact with said vertical member.

HENRI JACQUES MARC LAMBERT.
GEORGES PAUL MONGIN.

References Cited in the file of this patent

UNITED STATES PATENTS

| Number | Name | Date |
|---|---|---|
| 360,547 | Winslow | Apr. 5, 1887 |
| 615,127 | Baker | Nov. 29, 1898 |
| 860,278 | Botkin | July 16, 1907 |
| 918,039 | Grundmann | Apr. 13, 1909 |
| 1,053,996 | Isbell | Feb. 25, 1913 |
| 1,288,471 | Ballenberg | Dec. 24, 1918 |
| 1,290,982 | Haigh | Jan. 14, 1919 |
| 1,450,191 | Sturm | Apr. 3, 1923 |
| 1,569,158 | Tobey | Jan. 12, 1926 |
| 1,708,588 | Proctor | Apr. 9, 1929 |

FOREIGN PATENTS

| Number | Country | Date |
|---|---|---|
| 25,879 | Great Britain | A. D. 1913 |